United States Patent
Haberbusch et al.

(10) Patent No.: US 6,431,750 B1
(45) Date of Patent: Aug. 13, 2002

(54) FLEXIBLE TEMPERATURE SENSING PROBE

(75) Inventors: Mark S. Haberbusch, Amherst; Marian Felder, Strongsville; Alan J. Chmiel, Avon Lake, all of OH (US)

(73) Assignee: Sierra Lobo, Inc., Fremont, OH (US)

( * ) Notice: Subject to any disclaimer, the term of this patent is extended or adjusted under 35 U.S.C. 154(b) by 0 days.

(21) Appl. No.: 09/460,816

(22) Filed: Dec. 14, 1999

(51) Int. Cl.[7] .............................. G01K 7/00; G01F 23/00
(52) U.S. Cl. ...................... 374/166; 374/179; 374/185; 374/142; 73/292
(58) Field of Search .................. 374/166, 178, 374/179, 185, 142; 73/292

(56) References Cited

U.S. PATENT DOCUMENTS

| | | | |
|---|---|---|---|
| 3,653,262 A | * 4/1972 | Ehrenfried et al. | 374/142 |
| 3,852,570 A | * 12/1974 | Tyler | 219/528 |
| 4,362,403 A | * 12/1982 | Mooney | 374/4 |
| 4,509,095 A | 4/1985 | Boros | |
| 4,687,695 A | 8/1987 | Hamby | |
| 4,710,448 A | 12/1987 | Linder | |
| 4,756,076 A | * 7/1988 | Dyben et al. | 29/621.1 |
| 4,890,492 A | * 1/1990 | Andrejasich et al. | 73/292 |
| 4,915,507 A | * 4/1990 | Janotta | 374/115 |
| 4,961,806 A | 10/1990 | Gerrie et al. | |
| 4,965,702 A | 10/1990 | Lott et al. | |
| 4,969,749 A | * 11/1990 | Hasselmann | 374/115 |
| 5,049,221 A | 9/1991 | Wada et al. | |
| 5,052,223 A | * 10/1991 | Regnault et al. | 73/292 |
| 5,097,390 A | 3/1992 | Gerrie et al. | |
| 5,191,708 A | 3/1993 | Kasukabe et al. | |
| 5,192,132 A | * 3/1993 | Pelensky | 374/166 |
| 5,286,304 A | * 2/1994 | Macris et al. | 136/201 |
| 5,411,600 A | * 5/1995 | Rimai et al. | 136/225 |
| 5,414,371 A | 5/1995 | Isaac | |
| 5,444,254 A | 8/1995 | Thomson | |
| 5,482,793 A | 1/1996 | Burns et al. | |
| 5,491,891 A | 2/1996 | Isaac | |
| 5,550,406 A | 8/1996 | McCormick | |
| 5,792,070 A | 8/1998 | Kauphusman et al. | |
| 5,801,432 A | 9/1998 | Rostoker et al. | |
| 5,806,318 A | * 9/1998 | Dilorio et al. | 62/46.1 |
| 5,898,311 A | 4/1999 | Bodenweber et al. | |
| 5,900,316 A | 5/1999 | Yu | |
| 6,226,997 B1 | * 5/2001 | Vago | 62/130 |

OTHER PUBLICATIONS

Karunanithi, R. et al, "Development of Discrete Array Type Liquid Level Indicator for Cryogenic Fluids", pp. 1–6, handed out at Cryogenic Engineering Conference and International Cryogenic Materials Conference, Jul. 12–16, 1999, Palais des Congres, Montreal, Quebec, Canada.

Fjelstad, Joseph, "Flex Your Design Muscles", *Printed Circuit Design*, Jul. 1999, pp. 24–28.

Dempsey, Paula J. et al., "Using Silicon Diodes for Detecting the Liquid–Vapor Interface in Hydrogen", NASA TM–105541, Apr. 1992, pp. 1–13.

"Bulletin HS–201 Thermofoil Heaters", Minco Products, Inc., 1989, pp. 1–32.

* cited by examiner

Primary Examiner—Diego Gutierrez
Assistant Examiner—Lydia M. De Jesús
(74) Attorney, Agent, or Firm—Pearne & Gordon LLP

(57) ABSTRACT

A lightweight elongate flexible temperature probe includes several temperature sensors embedded inside multiple layers of a thin film polyimide or polyester in which two of the layers are thin film copper etched to form conductors to the sensors. The conductors are in abutting electrical contact with the sensors.

24 Claims, 2 Drawing Sheets

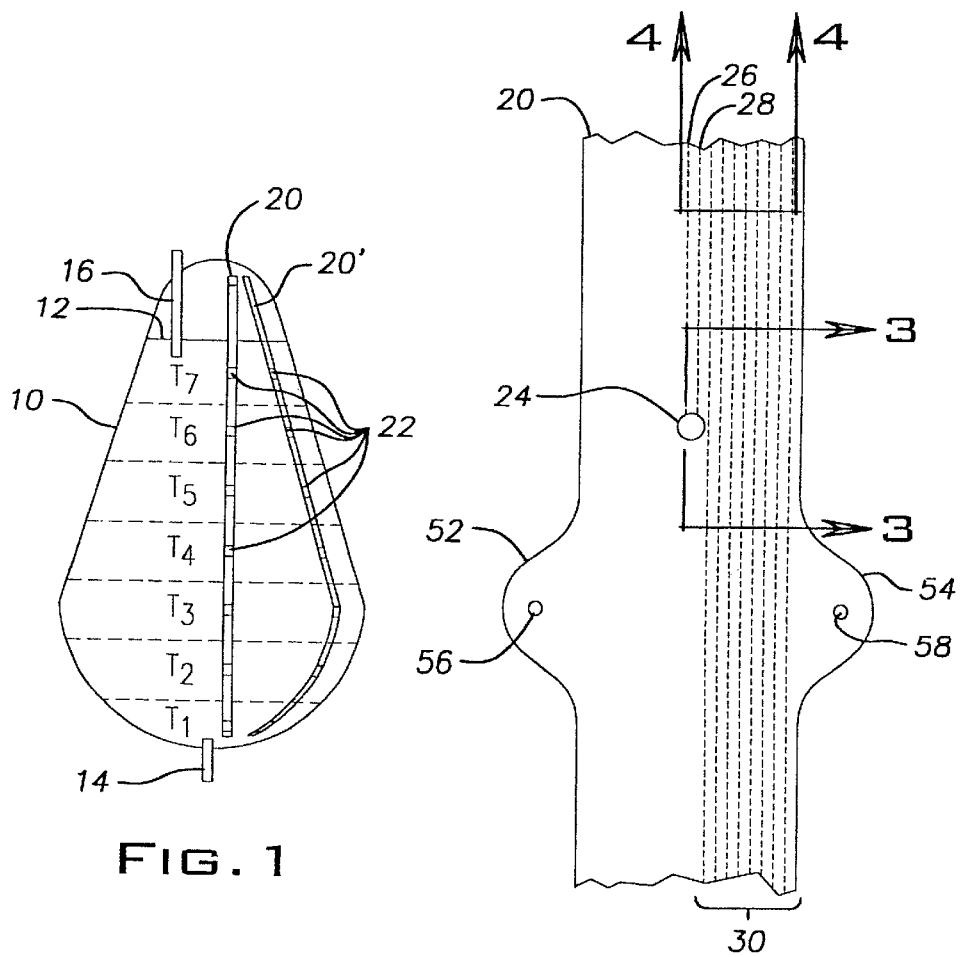
Fig. 1
Fig. 2
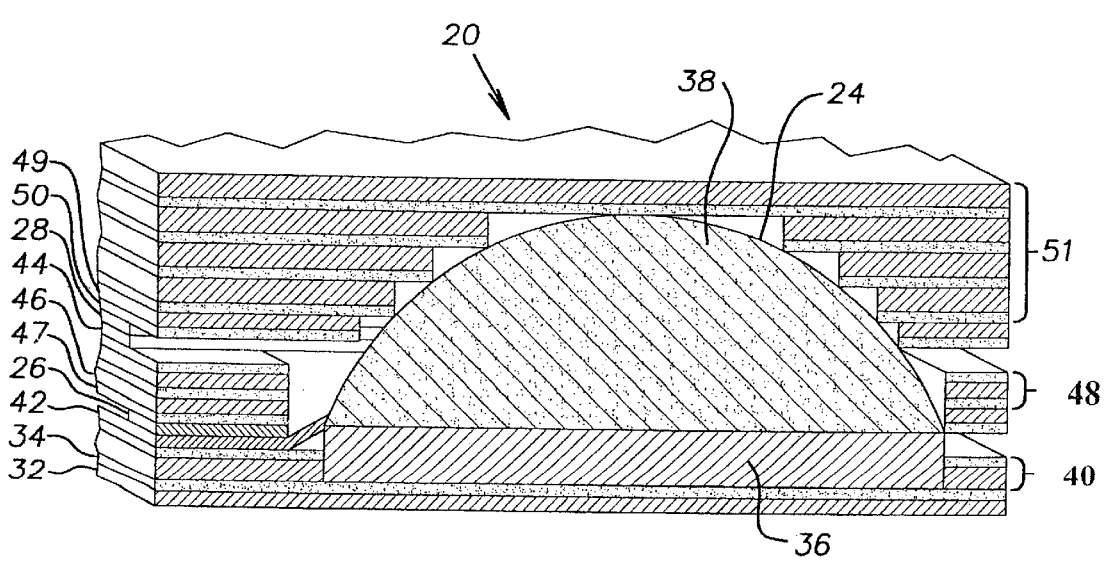
Fig. 3

FLEXIBLE TEMPERATURE SENSING PROBE

BACKGROUND OF THE INVENTION

The present invention relates to a temperature probe for measuring temperature gradients along the length of the probe and, in particular, to a probe for measuring temperatures in a tank of cryogenic liquid.

In cryogenic liquid tanks (for example, propellant tanks for aerospace vehicles), it is important to know the temperature in various levels of the liquid. As the density of the liquid varies with temperature, this information is important to determine such values as the mass of the liquid in the tank.

Propellant tanks are usually more than 5 feet tall and typically in the range of 8 to 100 feet tall. Typically, the measurement of the temperatures in these tanks has been done with temperature sensors mounted on a metallic rake-like structure consisting of vertical and horizontal beams with temperature sensors mounted at various locations on the rake. The vertical beam is typically hard mounted inside the tank from either the lid of the tank or from another structure located inside the tank. The horizontal beams are fastened to the vertical beam.

The rake is usually made from aluminum and is strong enough to support the temperature sensor mounting fixtures, the temperature sensors and the wiring harness. The mounting fixtures are typically constructed of a low conductivity material such as G-10. The wiring harness typically consists of Teflon coated copper wires. Typical temperature sensors include silicon diodes, thermocouples, thermopiles, thermistors, and RTDs.

Each temperature sensor within the tank typically has 2 or 4 wires that must penetrate the tank through multiple pin cryogenically rated electrical feed throughs and associated internal and external multiple pin connectors.

The weight of this rake structure has a significant adverse impact on mission performance and decreases the amount of useful payload on a flight vehicle. In addition, the rake structure is difficult to install in many tanks. Typically the rake must be assembled in sections because the entrances to the tank are too small to allow passage of a pre-assembled rake. Further, the interior geometry of a tank is often less than regular. This makes it difficult or impossible to measure temperatures in many areas of the tank with a rake.

Another disadvantage of a rake temperature probe (besides the large number of parts) is the many solder joints employed to connect the sensors to the wiring harness.

SUMMARY OF THE INVENTION

A cryogenic liquid temperature probe includes an elongate first dielectric layer having a first and a second surface, a plurality of temperature sensor units attached to the first layer second surface and spaced along a generally longitudinal direction, and an elongate second dielectric layer having a first and a second surface. The second layer first surface has an elongate conductor thereon for each unit that makes abutting electrical contact with the respective unit. The layers are flexible at room temperature.

BRIEF DESCRIPTION OF THE DRAWINGS

FIG. 1 is an elevation view of two probes according to the invention in a flight-type cryogenic propellant tank.

FIG. 2 is an enlarged view of a portion of one of the probes of FIG. 1.

FIG. 3 is an enlarged portion of a cross sectional view along the line 3—3.

DESCRIPTION OF THE PREFERRED EMBODIMENTS

Figure 4:
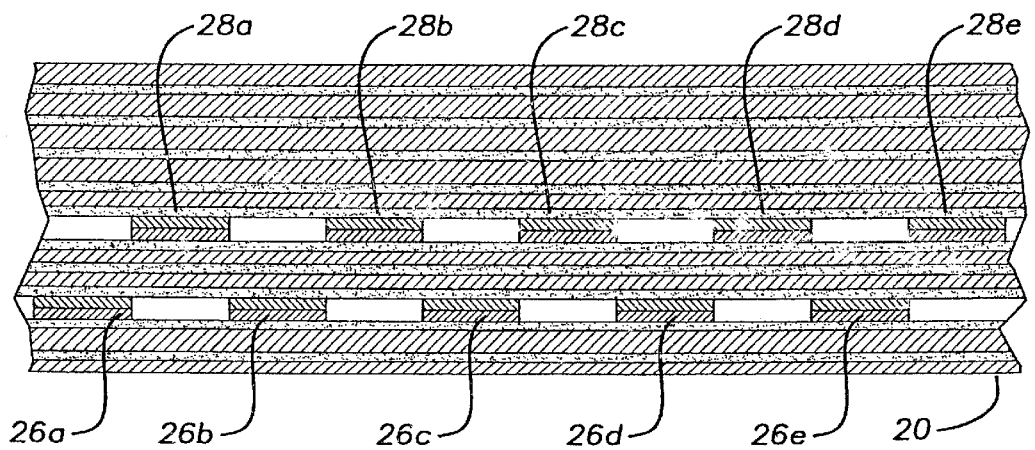
FIG. 4 is an enlarged cross sectional view along the line 4—4.

Referring to FIG. 1, a cryogenic propellant tank 10 contains a cryogenic liquid 12 (e.g., liquid hydrogen or oxygen). Heat leaking into the tank 10 causes the liquid 12 to warm and stratify due to natural buoyancy forces resulting from the temperature induced changes in density. The cold (subcooled) liquid enters the tank 10 through a bottom port 14 and warm liquid (relatively) is expelled from the tank through a siphon tube 16. The temperature in the tank 10 decreases in the tank 10 from the top $T_7$ to the bottom $T_1$, with $T_6$, $T_5$, $T_4$, $T_3$, and $T_2$ indicating temperatures of intermediate values.

The tank 10 is provided with a temperature probe 20, having spaced apart temperature sensors at several locations 22. The probe 20 is at least 2 feet long and preferably between 8 and 100 feet long. The length may be, for example, at least 5, 8, 10, 15, 20, 25, 30, 35, 40, 45, 50, 60, 70, 80, 90 or 100 feet. The width of the probe 20 is preferably between 0.2 and 5 inches and preferably about 1 inch. Referring to FIG. 2, the probe 20 includes an exemplary temperature sensing unit 24 connected to conductors 26, 28 and other conductors 30 connected to unshown sensing units at deeper locations.

Referring to FIGS. 3 and 4, in the preferred embodiment, the probe 20 includes a thin first layer 32 of a dielectric material coated with a pressure and heat cured adhesive layer 34. The temperature sensor unit 24 includes a mounting base 36 and a temperature sensor 38 is attached to the base 36.

A first series 40 of thin spacer layers of dielectric material and pressure and heat cured adhesive is adhered to the first layer 32. The series 40 of layers has a cutout portion to accommodate the base 36. In the preferred embodiment, the series 40 consists of a single layer of dielectric and a pressure and heat cured adhesive.

The unit 24 has a first lead 42 (e.g., anode lead) and a second lead 44 (e.g., cathode lead). The base 36 is adhered to the layer 34 and the lead 44 is temporarily bent upward from the plane of the layer 32 to allow the application of additional layers.

A thin second layer 46 of a dielectric material coated with a pressure and heat cured adhesive layer 47 arranged to adhere to the series 40 of layers. The layer 46 includes a cutout portion to accommodate the sensor 38. The layer 46 also includes the conductor 26 (i.e., conductors 26a, 26b, 26c, 26d, 26e, as well as unshown similar conductors higher up the length of the probe 20). The conductor 26 can advantageously be formed by etching a thin layer of copper deposited on the layer 46. The conductor 26 makes abutting electrical contact with the first lead 42, that is, contact is made from the touching rather than by solder or other bonding methods.

A second series 48 of thin spacer layers of dielectric material and pressure and heat cured adhesive is adhered to the second layer 46. The series 48 of layers has a cutout portion to accommodate the sensor 38. In the preferred embodiment, the series 48 consists of a single layer of dielectric material coated on both sides with a pressure and heat cured adhesive. The lead 44 is bent back to the plane of the series 48.

A thin third layer 49 of a dielectric material coated with a pressure and a heat cured adhesive layer 50 is adhered to the series 48 of layers. The layer 49 includes the conductor 28 (i.e., conductors 28a, 28b, 28c, 28d, 28e, as well as unshown similar conductors higher up the probe 20). The conductor 28 can be advantageously formed by etching a thin layer of copper deposited on the layer 49. The conductor 28 makes abutting electrical contact with the second lead 44. The layer 49 includes a cutout portion to accommodate the sensor 38.

A third series 51 of thin spacer layers of dielectric and pressure and heat cured adhesive is adhered to the third layer 49. The series 51 has a cutout portion to accommodate the sensor 38. In the preferred embodiment, the series 51 consists of four layers each of alternating dielectric and pressure and heat cured adhesive.

In the preferred embodiment, after assembling the layers of the probe 20, the layers are compressed together and heated to cure the adhesive. The layers of the probe 20 then seal the temperature sensing units 24 within the probe 20. In the process, gaps in the probe 20 are eliminated. When the probe 20 is compressed, a portion (e.g., the portion indicated by numeral 24 inn FIG. 2) immediately around the base 36 may be left uncompressed to avoid damaging the unit 24. This may be accomplished by squeezing the probe 20 between heated plates, at least one of which has a relief indentation or hole at the unit 24. In the preferred embodiment, the units 24 are sealed within the probe with the layers of dielectric and adhesive, no additional sheath or sleeve is needed to encapsulate the sensor units. The probe 20 does not need to be supported by a structure such as a balloon.

The probe 20 may also be provided with one or more sets of mounting tabs 52, 54 formed by tabs extending from one or more of the dielectric layers and including, if desired, fastener holes 56, 58.

The layers of dielectric material may be, for example, 0.2 to 5 mils thick and preferably about 1 mil thick. The dielectric material may be a polyimide or a polyester that is flexible at room temperature. In the preferred embodiment the material is Kapton polyimide film. Kapton is a registered trademark of DuPont. The Rogers Corporation Circuit Materials Division provides Kapton film with pressure and heat cured adhesive and/or copper coatings (e.g., R/flex 2005, where R/flex is a registered trademark of The Rogers Corporation). In the preferred embodiment, the probe 20 is elastically flexible at room temperature, primarily in the thin direction. At cryogenic temperatures (e.g., temperatures of liquid oxygen or hydrogen propellants), the probe 20 is generally rigid in whatever shape it had at room temperature.

The layers are elongate and the conductors 26, 28 run in a generally longitudinal direction with respect to the layers. The sensor units (and sensors) are spaced longitudinally along the probe. They may be, for example, two inches to twenty feet apart. They may be, for example, spaced at least 6 inches, 12 inches, 18 inches, 3 feet, 5 feet or 10 feet apart. As a further example there may be 25 to 50 sensor units spaced as desired in a 100 foot probe. The conductors may be, for example, 1 to 10 mils thick and 1 to 20 mils wide. Typically, the conductors are 10 mils wide and 5 mils thick.

If flexibility is not an issue the probe can also be made using a dielectric material such as G-10 which is commonly used for rigid circuit boards. G-10 is a continuous woven glass fabric laminated with epoxy resin. It is available with copper cladding and adhesive coatings.

In the preferred embodiment, the temperature sensors 38 are silicon diodes, the anode of which is adhered to the base 36. The temperature sensors 38 could also be other temperature sensors, for example, thermocouples, thermopiles, thermistors, or RTDs.

The mounting bases 36 may be, for example, a platinum plate 1.5 mm in diameter and 0.125 mm thick.

The units 24 are available as a base/sensor package from Lake Shore Cryotronics as a Model DT-421. The sensor 38 is sealed in an epoxy resin dome bonded to the base 36. The leads 42, 44 are each platinum ribbons about 1 inch long, 0.02 inches wide and 0.01 inches thick. The dome housing the diode may be, for example, 0.025 inches high.

It should be noted that while two layers 46, 49 having conductors are used in the preferred embodiment, it would be possible to configure sensor units in a manner that would allow the use of only a single layer with conductors, or additional layers with conductors could be used.

The present invention provides a probe that is substantially lighter than prior art rake probes. Prior art probes typically have a weight impact on a flight vehicle of 1 pound per sensor. The present invention is estimated to have an impact of 0.01 pounds per sensor or less.

As the present invention is basically one piece, installation complexity is greatly reduced. In addition, the abutting electrical connections of the present invention eliminate solder connections that are potential failure modes (there may be, for example, 64 sensors with 128 connections).

The packaging of temperature sensors inside multiple layers of Kapton holds the sensors and conductors and is thin enough not to inhibit sensor response time and accuracy. In addition, because the probe 20 is so lightweight and compact, redundant sensors can be easily incorporated for increased reliability.

Referring again to FIG. 1, the probe 20' illustrates another advantage of the present invention. The flexibility of the probe 20' allows the probe 20' to be mounted to conform to curving or other similar non-linear paths within the tank as well as to reach into portions of the tank that may be inaccessible to prior art probes.

Figures 5, 6:
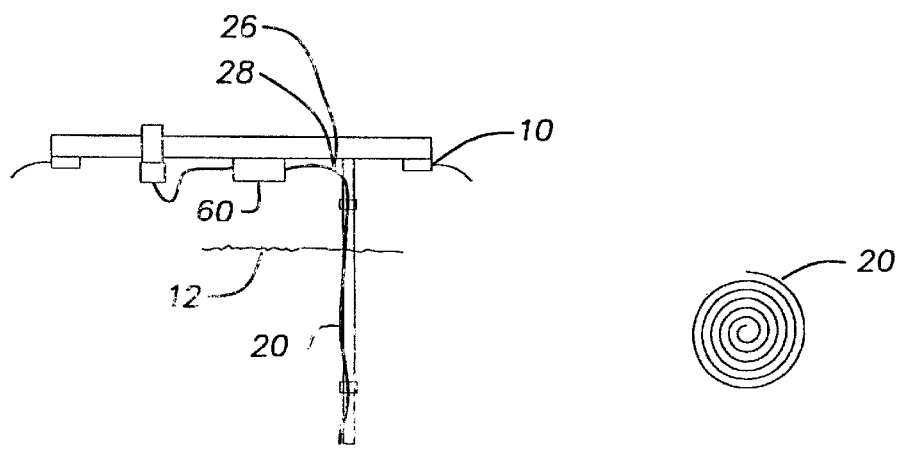
FIG. 5 is an elevation view of a probe according to the invention mounted in a tank and connected to a multiplexor.
FIG. 6 is an elevation view of a probe according to the invention in a coiled state.

Referring to FIG. 5, the probe 20 will typically have many conductors 26, 28 issuing out of the top of the probe 20. These conductors may be advantageously routed to a multiplexor 60 which electronically reduces the number of wires that must exit from the tank. For example, 64 sensors having a combined number of conductors of 128 can be reduced to four wires, including power. The multiplexor 60 may include, for example, a multiplexor itself, as well as analog to digital converters, signal conditioners and a power supply.

The probe 20 can also be mounted with some "slack" as shown to provide for thermal expansion/contraction. In addition, it may be desirable to leave some portions of the probe 20 unlaminated to avoid thermal stress.

The probe 20 can also be used to measure liquid level by supplying an additional amount of current to diode-based temperature sensors. The additional heat produced will cause the diode's temperature to rise if it is not immersed in liquid. This self heating phenomena produces a sharp and distinct change in sensor output signal depending on whether the sensor is in liquid or vapor. Because the sensors can be closely spaced in the vertical direction within the probe, the liquid level can be accurately determined.

Referring to FIG. 6, a probe 20 is shown coiled into a compact configuration. This temporary configuration not only makes the probe 20 easy to transport when not in the tank 10, but it also facilitates the probe 20 being easily carried into the tank 10 and uncoiled for installation.

The probe 20 may be installed in the tank 10 by attaching the probe 20 to any convenient hard point in the tank 10.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A cryogenic liquid temperature probe, said probe comprising:
   an elongate first dielectric layer having a first and a second surface;
   a plurality of temperature sensor units attached to said first layer second surface and spaced along a generally longitudinal direction, each said temperature sensor unit comprising a diode as a temperature sensor; and
   an elongate second dielectric layer having a first and a second surface, said second layer first surface having an elongate conductor thereon for each unit, each said elongate conductor making abutting electrical contact with a respective unit, said layers being flexible at room temperature.

2. A cryogenic liquid temperature probe according to claim 1, wherein each said temperature sensor unit comprises a mounting base and a temperature sensor having a first lead and a second lead, said first lead and said second lead each providing a location for abutting electrical contact for separate conductors.

3. A cryogenic liquid temperature probe according to claim 1, wherein said elongate conductors are etched from a metal layer on said second dielectric layer.

4. A cryogenic liquid temperature probe according to claim 1, wherein said layers are laminated with an adhesive.

5. A cryogenic liquid temperature probe according to claim 1, wherein said probe has a length of greater than two feet.

6. A cryogenic liquid temperature probe according to claim 1, wherein said probe has a length of at least 8 feet.

7. A cryogenic liquid temperature probe according to claim 1, wherein said units are spaced at least 6 inches apart.

8. A cryogenic liquid temperature probe according to claim 1, wherein said probe is temporarily coilable into a compact configuration.

9. A cryogenic liquid temperature probe according to claim 1, further comprising an electronic multiplexing unit in communication with said conductors, said multiplexing unit reducing the number of conductors necessary to carry signals from said sensor units to a signal receiver.

10. A cryogenic liquid temperature probe according to claim 1, wherein said sensor units provide signals for determining a level of said liquid.

11. A cryogenic liquid temperature probe according to claim 1, wherein said layers have tab portions extending therefrom for mounting said probe.

12. A cryogenic liquid temperature probe according to claim 1, wherein said first dielectric layer is polyimide material.

13. A cryogenic liquid temperature probe according to claim 12, wherein said second dielectric layer is polyimide material.

14. A cryogenic liquid temperature probe according to claim 13, wherein each of said first and second dielectric layers is 0.2 to 5 mils thick.

15. A cryogenic liquid temperature probe according to claim 13, said probe further comprising a plurality of additional layers of polyimide material adjacent said second dielectric layer.

16. A cryogenic liquid temperature probe according to claim 1, wherein each said diode is a silicone diode.

17. A cryogenic liquid temperature probe according to claim 1, said probe being effective to measure a temperature of liquid hydrogen and a temperature of liquid oxygen.

18. A cryogenic liquid temperature probe according to claim 1, said probe being capable of being effectively installed and utilized in a cryogenic propellant tank.

19. A cryogenic liquid temperature probe according to claim 1, each said diode being separated from the outside environment by a covering layer 0.2–5 mils thick.

20. A cryogenic liquid temperature probe according to claim 1, said probe comprising a plurality of layers of polymeric material bonded together, said plurality of layers being disposed adjacent said first dielectric layer or said second dielectric layer.

21. A cryogenic liquid temperature probe according to claim 1, said probe comprising a plurality of layers of polymeric material adhesively bonded together, said plurality of layers being disposed adjacent said first dielectric layer or said second dielectric layer.

22. A cryogenic liquid temperature probe according to claim 21, wherein each of said layers is polyimide material.

23. A cryogenic liquid temperature probe according to claim 1, wherein each said sensor unit is encapsulated within polyimide material.

24. A cryogenic liquid temperature probe according to claim 1, wherein each of said sensor units is adapted to sense both temperature and liquid level.

\* \* \* \* \*